United States Patent [19]

Nemoto et al.

[11] Patent Number: 4,523,247
[45] Date of Patent: Jun. 11, 1985

[54] SIGNAL DETECTION OPERATING LEVER DEVICE OF MAGNETIC RECORDING TAPE REPRODUCING APPARATUS

[75] Inventors: Shigeru Nemoto; Gorō Kitajima; Sinichi Saitou; Hazime Osada, all of Tokyo, Japan

[73] Assignee: Olympus Optical Co., Ltd., Tokyo, Japan

[21] Appl. No.: 628,122

[22] Filed: Jul. 9, 1984

Related U.S. Application Data

[63] Continuation of Ser. No. 382,207, May 26, 1982.

[30] Foreign Application Priority Data

May 28, 1981 [JP] Japan .................................. 56-81721

[51] Int. Cl.$^3$ ...................... G11B 15/48; G11B 15/18; G11B 15/32; G03B 1/04
[52] U.S. Cl. ...................................... 360/137; 360/69; 360/74.4; 242/208; 242/198
[58] Field of Search .................. 360/137, 69, 74.4, 72, 360/93, 96, 74.1, 74.2, 104, 105, 61–64, 128; 242/197, 199, 200, 198, 206–208; 74/483 PB; 369/27, 28

[56] References Cited

U.S. PATENT DOCUMENTS

| | | | |
|---|---|---|---|
| 3,972,070 | 7/1976 | Fukayama | 242/208 |
| 4,081,849 | 3/1978 | Onishi | 360/137 |
| 4,172,266 | 10/1979 | Onishi | 360/137 |
| 4,179,721 | 12/1979 | Nakazono | 360/137 |
| 4,330,801 | 5/1982 | Morinaga | 360/137 |

*Primary Examiner*—Robert M. Kilgore
*Attorney, Agent, or Firm*—Frishauf, Holtz, Goodman & Woodward

[57] ABSTRACT

A signal detection operating lever device comprises a first base plate, a second base plate parallel to the first base plate, a first operating lever between the base plates movable between a first position in which signal generator stops generating signal to stop running of a recording tape and a second position in which the signal generator generates the signal to determine a recording tape transport mode in the tape recorder, a second operating lever having a magnetic head and disposed between the base plates to move the magnetic head between a first position in which the head is separated from a tape and a second position in which the head comes in contact with the tape, an accidental erasure preventive lever movable between a first position in which the second operating lever is prohibited to move from the first position to the second position thereof, and a second position in which the second operating lever is allowed to move from the first position to the second position thereof, a third operating lever between the base plates movable between a first position which allows movement of the accidental erasure preventive lever between the first and second positions thereof, and a second position in which the accidental erasure preventing lever is kept at the second position thereof, a function selecting switch connected to the second and third operating levers for allowing the head to function as an erase head upon movement of the second operating lever to the second position thereof and for allowing the head to function as a signal detecting head upon movement of the third operating lever to the second position thereof.

3 Claims, 9 Drawing Figures

SIGNAL DETECTION OPERATING LEVER DEVICE OF MAGNETIC RECORDING TAPE REPRODUCING APPARATUS

This application is a continuation of application Ser. No. 382,207, filed May 26, 1982.

BACKGROUND OF THE INVENTION

This invention relates to a signal detection operating lever device for detecting a CUE signal from a magnetic recording tape mounted in a magnetic recording tape reproducing apparatus.

In conventional magnetic recording tape reproducing apparatus, especially, in a magnetic recording tape reproducing apparatus one of the selling points of which lies in compact design or miniaturization, a signal detector for detecting a CUE signal from the magnetic recording tape is not mounted. This is because a signal detector is not an essential component in the compact magnetic recording tape reproducing apparatus. If a signal detector and a signal detection operating lever device are arranged in the compact magnetic recording tape reproducing apparatus, the mechanism of the operating lever device becomes complex and the outer dimensions of the magnetic recording tape reproducing apparatus are inevitably enlarged.

SUMMARY OF THE INVENTION

Therefore, an object of the present invention is to provide a signal detection operating lever device which is capable of simplifying the mechanism of the operating lever device and facilitating the manufacturing and the assembling of the operating lever device, and which still allows compact outer dimensions of a magnetic recording tape reproducing apparatus.

The above object of the present invention may be attained by a signal detection operating lever device comprising: a first base plate; a second base plate parallel to the first base plate with a distance therebetween; a first operating lever disposed between the first and second base plates to be movable therealong between a first position in which signal generating means stops generating an electrical signal and a second position in which the signal generating means generates the electrical signal to set up a magnetic recording tape transport mode in a magnetic recording tape reproducing apparatus; a second operating lever having a magnetic head and disposed between the first and second base plates to move the magnetic head along the first and second base plates between a first position in which the magnetic head is separated from the magnetic recording tape of a tape cassette and a second position in which the magnetic head comes in contact with the magnetic recording tape; an accidental erasure preventive lever disposed at least at one of the first and second base plates to be movable between a first position in which the second operating lever is prohibited to move from the first position to the second position thereof, and a second position in which the second operating lever is allowed to move from the first position to the second position thereof; a third operating lever disposed between the first and second base plates to be movable between a first position which allows movement of the accidental erasure preventive lever between the first position and the second position thereof along the first and second base plates, and a second position in which the acciden-tal erasure preventive lever is kept at the second position thereof; and magnetic head function selecting means connected to the second and third operating levers for allowing the magnetic head to function as an erasing head upon movement of the second operating lever to the second position thereof and for allowing the magnetic head to function as a signal detecting head upon movement of the third operating lever to the second position thereof.

Now an embodiment of this invention will be described in detail with reference to the accompanying drawings.

DETAILED DESCRIPTION OF THE PREFERRED EMBODIMENT

Figure 1:
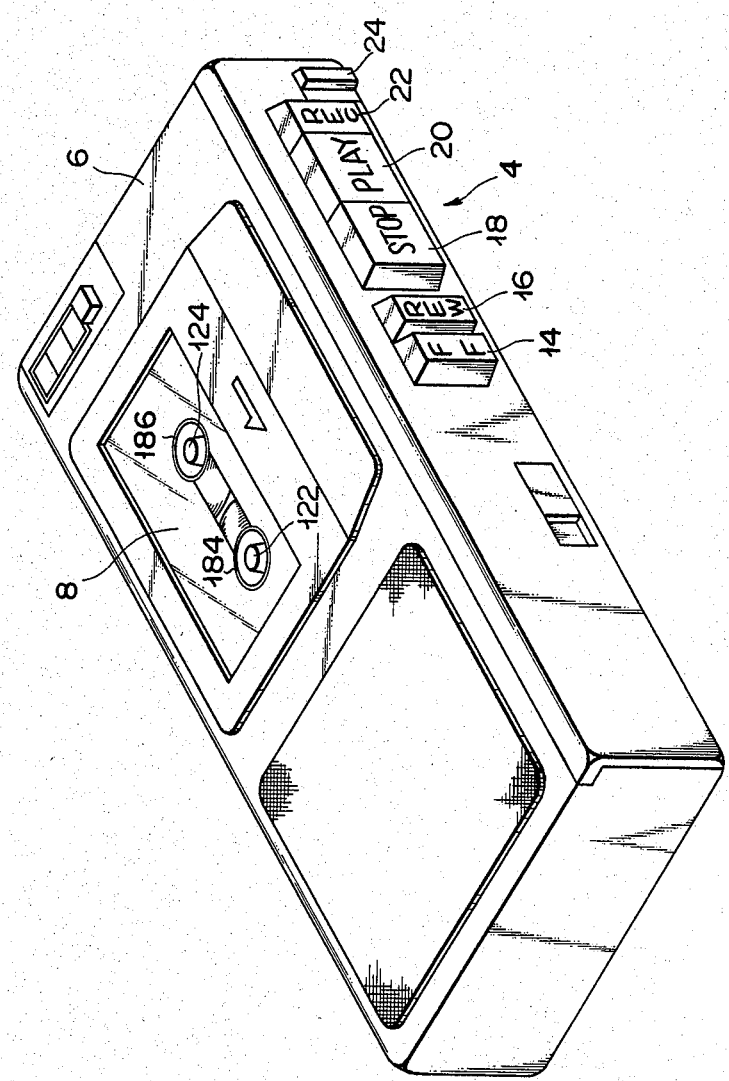
FIG. 1 is a perspective view of a tape recorder as a magnetic recording tape reproducing apparatus which is provided with a signal detection operating lever device according to an embodiment of this invention.

FIG. 1 shows an electric appliance 6 which is provided with a signal detection operating lever device 4 according to an embodiment of this invention. In this embodiment, the electric appliance 6 is a tape recorder using what is called a micro cassette 8, one of the selling points of which lies in compact design or miniaturization.

Figure 2:
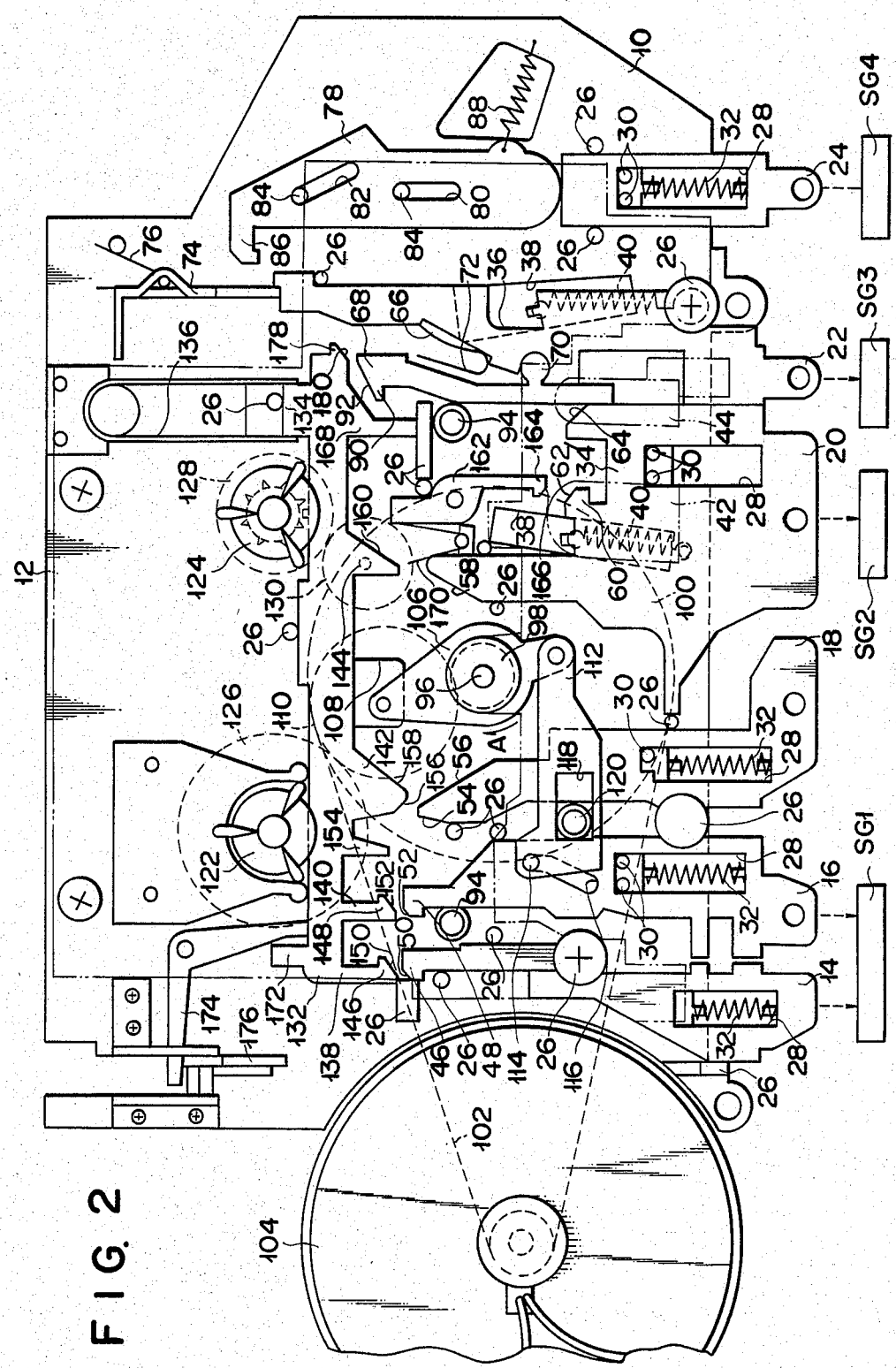
FIG. 2 is a plan view showing a state in which a plurality of operating levers of an operating lever device of the tape recorder including the embodiment of the invention are located in their respective first position.

The signal detection operating lever device 4 is provided with a flat first base plate 10 inside the housing of the electric appliance 6, as shown in FIG. 2.

In front of the first base plate 10, as shown in FIG. 2, a flat second base plate 12 is disposed parallel thereto at a given space therefrom.

Arranged between the first and second base plates 10 and 12 are first to sixth operating levers 14, 16, 18, 20, 22 and 24 formed of flat metal plates.

As shown in FIG. 2, the first to sixth operating levers 14, 16, 18, 20, 22 and 24 are vertically elongated and substantially parallel to one another. The respective lower ends of the first to sixth operating levers 14, 16, 18, 20, 22 and 24 project from the lower edges of the first and second base plates 10 and 12 into the outside space.

A plurality of guide projections 26 are formed on the front surface of the first base plate 10.

As shown in FIG. 2, some of the guide projections 26 are in contact with the vertically extending right and left edges of the first to sixth operating levers 14, 16, 18, 20, 22 and 24. Having their vertical edges in slide contact with the guide projections 26, the first to sixth operating levers 14, 16, 18, 20, 22 and 24 are allowed to move only in the vertical direction. A rightwardly projected portions are formed on the right-hand side faces of the first and fifth operating levers 14 and 22, and the lower end faces of the projected portions are in contact with the guide projections 26 in the state shown in FIG. 2. The positions of the first and fifth operating levers 14 and 22 in this state are defined as their first positions.

As shown in FIG. 2, vertically extending slots 28 are formed in the first to fourth and sixth operating levers 14, 16, 18, 20 and 24. Stoppers 30 fixed on the front surface of the first base plate 10 are in contact with the upper end faces of the slots 28 of the second to fourth and sixth operating levers 16, 18, 20 and 24. The position of the second to fourth and sixth operating levers 16, 18, 20 and 24 in this state are defined as their first positions. Urging means 32 are fitted in the slots 28 of the first to third and sixth operating levers 14, 16, 18, 24. In this embodiment, the urging means 32 is formed of a compression coil spring, the upper end of which abuts on the lower end face of the first base plate 10, and the lower end of which abuts on the lower end face of the slot 28. The diameter of the urging means 32 is only a little greater than the sum of the thicknesses of the first and second base plates 10, 12 and the thickness of each one of the first to third and sixth operating levers 14, 16, 18 and 24. Therefore, the urging means 32 projects only slightly from the back surface of the first base plate 10 into the outside space. The urging means 32 urge the first to third and sixth operating levers 14, 16, 18 and 24 to be located at their respective first positions. A rightwardly projected support portion 34 is formed on the right-hand side face of the fourth operating lever 20.

A notch 36 is formed on the right-hand side face of the fifth operating lever 22. Two elongate holes 38 are formed in the first base plate 10 so as to cross with the upper end face (viewed in the figure) of the support portion 34 of the fourth operating lever 20 and with a lower end face of the notch 36 of the fifth operating lever 22, respectively. Terms "upper" and "lower" indicate the upper and lower sides of the figure, unless otherwise specified. Urging means 40 are disposed in the elongate holes 38, respectively. In this embodiment, the urging means 40 are constituted by torsion coil springs, respectively. The upper ends of the urging means 40 are respectively hooked at a projection formed at the upper end face of the support portion 34 of the fourth operating lever 20 and a projection formed on the lower end face of the notch 36 of the fifth operating lever 22. The lower ends of the urging means 40 are fixed onto the back surface of the first base plate 10 in the vicinities of the lower ends of the elongate holes 38. Therefore, the urging means 40 urges the fourth and fifth operating levers 20 and 22 toward the first positions thereof.

In front of the support portion 34, a magnetic head 42 is disposed ahead of the front surface of the second base plate 12. The magnetic head 42 is fixed on the support portion 34 by means of a leg (not shown) passed through a hole (not shown) formed in the second base plate 12.

In front of the fifth operating lever 22, an erase head 44 is disposed ahead of the front surface of the second base plate 12. The erase head 44 is fixed on the fifth operating lever 22 by means of a leg (not shown) passed through a hole (not shown) formed in the second base plate.

In this embodiment, the erase head 44 is of an electrically activated type and is used to function as the signal detection head. The erase head 44 corresponds to the magnetic head of the present invention.

Leftwardly projected first and second engaging portions 46 and 48 are formed at the upper end portions of the first and second operating levers 14 and 16 respectively. The intersectional region between the upper end face and left-hand side face of each one of the first and second engaging portions 46 and 48 is chamfered to form a first or second slant face 50 or 52.

The intersectional regions between the upper end face and the left- and right-hand side faces of the third operating lever 18 are chamfered to form two third slant faces 54 and 56. The intersectional region between the upper end face and left-hand side face of the fourth operating lever 20 is chamfered to form one fourth slant face 58. An indentation is formed in the upper end face of the support portion 34, and the other fourth engaging portion 60 projects to the right in the indentation, as shown in FIG. 2. The intersectional region between the upper end face and right-hand side face of the other fourth engaging portion 60 is chamfered to form the other fourth slant face 62, as shown in FIG. 2. The intersectional region between the upper end face and right-hand side face of the support portion 34 is chamfered to form a chamfer portion 64.

Formed on the left-hand side face of the fifth operating lever 22 is a slant face 66 which has a tilt to the right from a position above the upper end face of the support portion 34 of the fourth operating lever 20. A circular indentation is formed at the lower end portion of the slant face 66, part of the indentation opening in the slant face 66.

A rocking lever 68 is disposed to vertically extend along the left-hand side face of the fifth operating lever 22. The lower end of the right-hand side face of the rocking lever 68 is in contact with a portion of left-hand side face of the fifth operating lever 22 where is located just under the intersectional region between the left-hand side face of the fifth operating lever 22 and the slant face 66. The lower end portion of the left-hand side face of the rocking lever 68 is in contact with a portion of the right-hand side face of the support portion 34 of the fourth operating lever 20 where is located just under the intersectional region between the right-hand side face of the support portion 34 and the slant face 66. A projected portion 70 which is inserted into the opening of the indentation of the slant face 66 of the fifth operating lever 22 is formed at the right-hand side face of the rocking lever 68. The outer peripheral surface of the projected portion 70 has a circular shape and has the same diameter as that of the indentation of the left-hand side face of the fifth operating lever 20 so that the projected portion 70 is fitted in the inner peripheral surface of the indentation and is able to slidably contact with the inner peripheral surface.

As shown in FIG. 2, the region of the right-hand side face of the rocking lever 68 above the projected portion 70 and the slant face 66 of the fifth operating lever 22 face each other with a space between them, in which an urging means 72 to react against compression is disposed.

An accidental erasure preventive lever 74 is disposed over the upper end face of the fifth operating lever 22. The accidental erasure preventive lever 74 extends vertically and is pivotally mounted substantially at the middle on the front surface of the first base plate 10. Thus, the accidental erasure preventive lever 74 can rotate along the front surface of the first base plate 10. The upper end portion of the accidental erasure preventive lever 74 is bent to the left to form a detecting section for detecting an accidental erasure preventive lug of the tape cassette 8. The lower end face of the accidental erasure preventive lever 74 is in contact with the upper end face of the fifth operating lever 22. Further, the lower end portion of the right-hand side face of the accidental erasure preventive lever 74 is in contact with the left-hand side face of a projection which protrudes upward from the upper end face of the fifth operating lever 22. The position of the accidental erasure preventive lever 74 in this state is defined as its first position. The accidental erasure preventive lever 74 is urged by an urging means 76 to be located in its first position and prevent the fifth operating lever 22 from upwardly movement from its first position.

A flat drive member 78 which vertically extends beyond the upper end face of the sixth operating lever 24 is disposed between the first and second base plates 10 and 12. A first guide hole 80 extending vertically is formed in the flat drive member 78. A second guide hole 82 extending vertically is also formed in the drive member 78. The second guide hole 82 is located above the first guide hole 80 and slightly tilted to the left. A guide pin 84 fixed on the front surface of the first base plate 10 is inserted in the upper end of each one of the first and second guide holes 80 and 82. The lower end face of the flat drive member 78 has a semicircular shape and is in contact with the upper end face of the fifth operating lever 22. An abutment member 86 extending to the left is formed at the upper end of the left-hand side face of the flat drive member 78. The left-hand side face of the abutment member 86 is located to the right of the lower end of the right-hand side face of the accidental erasure preventive lever 74, as shown in FIG. 2.

The position of the flat drive member 78 in this state is defined as a first position of the flat drive member 78.

One end of an urging means 88 is connected to the flat drive member 78 at a position below the guide pin 84 inserted into the first guide hole 80. The other end of the urging means 88 is connected to the front surface of the first base plate 10 at a position to the right of the position of the one end thereof and below one end thereof. The urging means 88 urges the flat drive member 78 toward the first position of the flat drive member 78. In this embodiment, the urging means 88 is constituted by a torsion coil spring.

A leftwardly projected fifth engaging portion 90 is formed at the upper end portion of the left-hand side face of the rocking lever 68. The intersectional region between the left-hand side face and upper end face of the fifth engaging portion 90 is chamfered to form a fifth slant face 92.

Between the upper end portion of the first operating lever 14 and the upper end portion of the second operating lever 16 and between the upper end portion of the fourth operating lever 20 and the upper end portion of the rocking lever 68 of the fifth operating lever 22, cassette positioning pins 94 are fixed on the front surface of the first base plate 10, respectively, as shown in FIG. 2. The front ends of the cassette positioning pins 94 penetrate the second base plate 12 to be located ahead thereof.

Between the respective upper end portions of the third and fourth operating levers 18 and 20, a capstan 96 is rotatably mounted on the first base plate 10. The front end of the capstan 96 penetrates the second base plate 12 to be located ahead thereof.

As shown in FIG. 2, a first gear 98 and a flywheel 100 are concentrically fixed to the rear end of the capstan 96 at the back side of the first base plate 10. A driving belt 102 is wound round the peripheral surface of the flywheel 100 and the output shaft of an electric motor 104 which is fixed on the first base plate 10, as shown in FIG. 2.

Between the upper end portion of the third operating lever 18 and the upper end portion of the fourth operating lever 20, a first rotating lever 106 is mounted on the front surface of the first base plate 10 so as to be able to rotate coaxially with the capstan 96. The first rotating lever 106 extends vertically, and can rotate between the first and second base plates 10 and 12 between them.

A backwardly projected shaft is fixed to the back surface of the upper end portion of the first rotating lever 106. This shaft is passed through a hole 108 formed in the first base plate 10. And a second gear 110 is rotatably attached to the rear end of the shaft at the back side of the first base plate 10. The second gear 110 is in mesh with the first gear 98.

In this embodiment, as shown in FIG. 2, the second base plate 12 is notched at the region located below the capstan 96 and facing the second to fifth operating levers 16, 18, 20 and 22. Accordingly, the lower end portion of the first rotating lever 106 is not opposite to the second base plate 12.

The right-hand end portion of a horizontally extending flat coupling member 112 is rotatably mounted on the front surface of the lower end portion of the first rotating lever 106. The left-hand end portion of the coupling member 112 lies on the front surface of the second operating lever 16.

The thickness of the coupling member 112 is equal to that of the second base plate 12. Thus, the coupling member 112 is located within a space between the respective front faces of the first rotating lever 106 and the second operating lever 16, which face the second base plate 12, and the front surface of the second base plate 12, which is to bear the tape cassette 8 set in the tape recorder as the electric appliance 6. Accordingly, the coupling member 112 does not project ahead of the front surface of the second base plate 12.

A backwardly projected guide pin 114 is fixed to the back surface of the left-hand end portion of the coupling member 112. The guide pin 114 is fitted in a guide hole 116 in the second operating lever 16. The guide hole 116 extends straight in the vertical direction and has a tilt to the right. The guide pin 114 of the coupling member 112 is positioned at the upper end of the guide hole 116.

A horizontally extending slot 118 is formed in the coupling member 112. Passed through the left-hand end portion of the slot 118 is a shaft 120 which protrudes forwardly from the first base plate 10 between the right-hand side face of the second operating lever 16 and the left-hand side face of the third operating lever 18. The outer peripheral surface of the shaft 120 is in contact with the horizontally extending upper and lower end face portions of the inner peripheral surface of the slot 118 of the coupling member 112.

Over the upper end faces of the third and fourth operating levers 16 and 20, first and second reel shafts 122 and 124 are rotatably mounted on the first base plate 10. The front ends of the first and second reel shafts 122 and 124 penetrate the second base plate 12 to be located ahead of the front surface of the second base plate 12. Third and fourth gears 126 and 128 are concentrically fixed to the rear ends of the first and second reel shafts 122 and 124 at the back of the first base plate 10. The third gear 126 is in mesh with the second gear 110. The position of the first rotating lever 106 in this state is defined as its first position. A fifth gear 130 is rotatably attached to the back surface of the first base plate 10. The fifth gear 130 is located within the locus of movement of the second gear 110 described as the first rotating lever 106 rotates clockwise from its first position as shown in FIG. 2, and is in mesh with the fourth gear 128.

Between the first and second base plates 10 and 12, as shown in FIG. 2, a flat auxiliary operating lever 132 lies over the respective upper end faces of the first to fourth operating levers 14, 16, 18 and 20 and the rocking lever 68 of the fifth operating lever 22. The auxiliary operating lever 132 has an elongate shape extending horizontally.

As shown in FIG. 2, some of the guide projections 26 are in contact with the horizontally extending upper and lower end faces of the auxiliary operating lever 132. Having its upper and lower end faces in slide contact with the guide projections 26, the auxiliary operating lever 132 is allowed to move only in the horizontal direction.

As shown in FIG. 2, an upwardly projected portion 134 is formed on the upper end face of the auxiliary operating lever 132.

The vertically extending left- and right-hand side faces of the upwardly projected portion 134, as shown in FIG. 2, are subjected to opposite urging forces applied by an urging means 136 which is disposed between the first and second base plates 10 and 12. The auxiliary operating lever 132 ceases to move horizontally at the position where the two urging forces of the urging means 136 are balanced with each other. This position of the auxiliary operating lever 132 is defined as its first position. In this embodiment, the urging means 136 is formed of a U-shaped leaf spring, having a pair of leg portions severally in contact with the left- and right-hand side faces of the upwardly projected portion 134 of the auxiliary operating lever 132. The urging force of the urging means 136 is greater than the urging force of the urging means 72 of the rocking lever 68. The dimension of the leaf spring along the thickness of the signal detection operating lever device 4 can be made smaller than that of a coil spring.

As shown in FIG. 2, downwardly projected first to fourth hanging portions 138, 140, 142 and 144 are formed at the portions of the auxiliary operating lever 132 facing the upper end faces of the first to fourth operating levers 14, 16, 18 and 20. A rightwardly projected first and second engaged portions 146 and 148 are formed at the lower end portions of the first and second hanging portions 138 and 140. The intersectional region between the lower end face and right-hand side face of each one of the first and second engaged portions 146 and 148, as shown in FIG. 2, is chamfered to form a first or second auxiliary slant face 150 or 152. The first and second auxiliary slant faces 150 and 152 vertically face the first and second slant faces 50 and 52 of the first and second operating levers 14 and 16, respectively.

Between the second hanging portion 140 and the third hanging portion 142, a downwardly projected stopper 154 is formed on the lower end face of the auxiliary operating lever 132.

The distance between the left-hand side face of the second hanging portion 140 and the right-hand side face of the first engaged portion 146 of the first hanging portion 138 is greater than the distance between the right-hand side face of the upper end portion of the first operating lever 14 and the left-hand side face of the first engaging portion 46. The distance between the left-hand side face of the stopper 154 and the right-hand side face of the second engaged portion 148 of the second hanging portion 140 is greater than the distance between the right-hand side face of the upper end portion of the second operating lever 16 and the left-hand side face of the second engaging portion 48.

The intersectional region between the left-hand side face and lower end face of the third hanging portion 142 is chamfered to form one third auxiliary slant face 156. The one third auxiliary slant face 156 vertically faces the other third slant face 56 of the third operating lever 18.

As shown in FIG. 2, the right-hand side face of the third hanging portion 142 has a tilt to the upper right to form the other third auxiliary slant face 158.

As shown in FIG. 2, the right-hand side face of the fourth hanging portion 144 has a tilt to the upper right to form a fourth auxiliary slant face 160.

A vertically extending second rotating lever 162 lies between the upper end portion of the fourth operating lever 20 and the upper end portion of the rocking lever 68 of the fifth operating lever 22, as well as between the first and second base plates 10 and 12. The second rotating lever 162 is pivotally mounted substantially at the middle on the front surface of the first base plate 10, and can rotate along the front surface of the first base plate 10. A leftwardly extending fourth engaging portion 164 is formed at the lower end portion of the left-hand side face of the second rotating lever 162. The intersectional region between the left-hand side face and lower end face of the fourth engaging portion 164 is chamfered to form a slide contact surface 166, which vertically faces the other fourth slant face 62 of the fourth operating lever 20. One of the guide projections 26 is in contact with the right-hand side face of the upper end portion of the second rotating lever 162 so that the second rotating lever 162 is allowed to rotate only in the counterclockwise direction from its first position as shown in FIG. 2. The position of the second rotating lever 162 in this state is defined as its first position.

The second rotating lever 162 is urged to be located in the first position by an urging means 167 which is disposed between the first and second base plates 10 and 12.

Between the respective upper end portions of the second rotating lever 162 and the rocking lever 68, a downwardly projected first hook member 168 is formed on the lower end face of the auxiliary operating lever 132. As shown in FIG. 2, the left-hand side face of the first hook member 168 faces the right-hand side face of the upper end portion of the second rotating lever 162 with a given horizontal space between them.

An upwardly projected second hook member 172 is formed on the left-hand end portion of the upper end face of the auxiliary operating lever 132.

Between the first and second base plates 10 and 12, an inverted L-shaped third rotating lever 174 is disposed over the second hook member 172. The third rotating lever 174 is pivotally mounted substantially at the middle on the front surface of the first base plate 10, and can rotate along the front of the first base plate 10. The left-hand side face of the lower end portion of the third rotating lever 174 abuts on the right-hand side face of the second hook member 172 of the auxiliary operating lever 132. The lower end face of a leftwardly extending portion of the third rotating lever 174 is in contact with that region of an ejecting lever 176 which is off the rocking center thereof, the ejecting lever 176 being mounted on the first base plate 10 so as to be able to rock in the direction to cross the front surface of the first base plate 10.

A rightwardly projected fifth engaged portion 178 is formed on the right-hand side face of the auxiliary operating lever 132. The intersectional region between the right-hand side face and lower end face of the fifth engaged portion 178 is chamfered to form a fifth auxiliary slant face 180. The fifth auxiliary slant face 180 vertically faces the fifth slant face 92 of the rocking lever 68.

The first and second operating levers 14 and 16 are coupled with a first signal generator SG1. When one of the first and second operating levers 14 and 16 stops upward movement from its first position against the urging force of the urging means 32, the first signal generator SG1 produces a first electric signal to rotate the output shaft of the motor 104 in one direction at relatively high speed, thereby rotating the capstan 96 and the first gear 98 in the direction indicated by arrow A in FIG. 2 at relatively high speed.

The fourth operating lever 20 is coupled with a second signal generator SG2. When the fourth operating lever 20 stops upward movement from its first position against the urging force of the urging means 40, the second signal generator SG2 produces a second electric signal to rotate the output shaft of the motor 104 in one direction at relatively low speed, thereby rotating the capstan 96 and the first gear 98 in the direction indicated by arrow A in FIG. 2 at relatively low speed. At the same time, the second signal generator SG2 causes the magnetic head 42 to function as a reproducing head.

The fifth operating lever 22 is coupled with a third signal generator SG3. When the fifth operating lever 22 stops upward movement from its first position against the urging force of the urging means 40, the third signal generator SG3 causes the magnetic head 42 to function as a recording head.

The drive member 78 is coupled with a fourth signal generator SG4. When the drive member 78 stops upward movement from its first position against the urging force of the urging means 32, the fourth signal generator SG4 produces a fourth electric signal to cause the the erasure head 44 to function as a signal detection head.

In this embodiment, the first to fourth signal generators SG1, SG2, SG3 and SG4 are of conventional arrangements.

In this embodiment, the first and second operating levers 14 and 16 constitute the first operating lever of this invention. And the fifth operating lever 22 constitutes the second operating lever of this invention. Furthermore, the sixth operating lever 24 and the drive member 78 constitute the third operating lever of this invention.

There will now be described the operation of the signal detection operating lever device 4 according to the one embodiment of this invention which is constructed in the above-mentioned manner. The second base plate 12 is shown in FIG. 2 but not shown in FIGS. 3 to 9 for avoiding the complication of the drawing.

Figure 3:
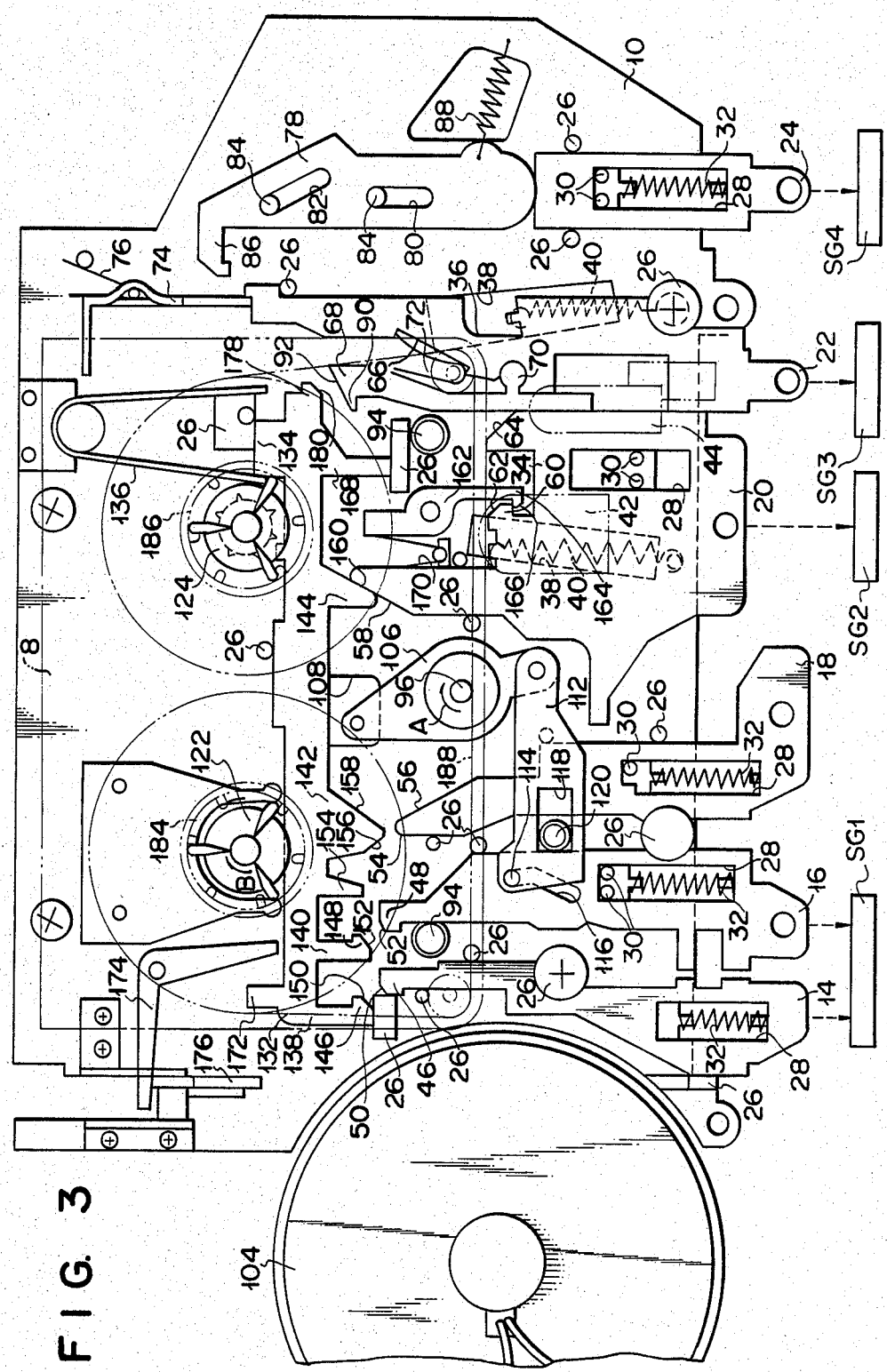
FIG. 3 is a plan view showing a state in which a pair of reel hubs of a tape cassette without accidental erasure preventive lugs are mounted on a pair of reel shafts of the tape recorder of FIG. 2, and in which a fourth operating lever to function as a playback lever is located in its second position.

As shown in FIG. 3, the first and second reel shafts 122 and 124 are fitted with first and second reel hubs 184 and 186, respectively, of the tape cassette 8. In this state, the capstan 96 is in contact with the back surface of a magnetic recording tape 188 between the first and second reel hubs 184 and 186.

The tape cassette 8 has no accidental erasure preventive lugs. Therefore, the accidental erasure preventive lever 74 does not detect the accidental erasure preventive lugs. In other words, since the accidental erasure preventive lever 74 is not brought into contact with the accidental erasure preventive lugs, the accidental erasure preventive lever 74 remains in the first position thereof, as shown in FIG. 3.

When the fourth operating lever 20 is pressed upward, it moves up from its first position against the urging force of the urging means 40. The one fourth slant face 58 of the upwardly moving fourth operating lever 20 comes into slide contact with the fourth auxiliary slant face 160 of the auxiliary operating lever 132, causing the auxiliary operating lever 132 to move from its first position to the left against the urging force of the urging means 136. Also, the other fourth slant face 62 of the fourth engaging portion 60 of the upwardly moving fourth operating lever 20 comes into slide contact with the other slide contact surface 166 of the second rotating lever 162, causing the second rotating lever 162 to rotate counterclockwise from its first position against the urging force of the urging means 170. When the fourth engaging portion 60 engages the fourth engaged portion 164 of the second rotating lever 162, as shown in FIG. 3, the fourth operating lever 20 stops moving upwardly. The position of the fourth operating lever 20 in this state is defined as its second position.

The horizontal position of the auxiliary operating lever 132 when the fourth operating lever 20 is located in its second position shown in FIG. 3 is defined as a first position of the auxiliary operating lever 132. When the fourth operating lever 20 is located in its second position, the second signal generator SG2 causes the motor 104 to rotate the capstan 96 in the clockwise direction as indicated by arrow A in FIG. 3 at fixed relatively low speed. The rotation of the capstan 96 is transmitted through the first to third gears 98, 110 and 126 to the first reel shaft 122, which then rotates in the direction indicated by arrow B. Moreover, when the fourth operating lever 20 is located in its second position, a pinch roller (not shown) is brought into contact with the front surface of the magnetic recording tape 188. This pinch roller holds the tape 188 in conjunction with the capstan 96. Thus, the tape 188 is wound around the first reel hub 184 after it is drawn out from the side of the second reel hub 186 by the capstan 96 and the pinch roller.

Furthermore, when the fourth operating lever 20 is located in its second position, the magnetic head 42 comes into contact with the front surface of the magnetic recording tape 188, as shown in FIG. 3.

Moreover, when the fourth operating lever 20 is located in its second position, the second signal generator SG2 causes the magnetic head 42 to function as the reproducing head. In this state, therefore, information previously recorded on the magnetic recording tape 188 is reproduced by the magnetic head 42 as the tape 188 runs from the second reel hub 186 to the first reel hub 184 at the fixed speed. Thus, a playback mode is established in the tape recorder 6 which is provided with the signal detection operating lever device 4 according to this embodiment. This means that the fourth operating lever 20 serves as a reproducing or playback lever in the tape recorder 6.

When the auxiliary operating lever 132 is located in its second position, the loci of the upward movement of the right-hand side face of the upper end portion of the first operating lever 14 and the left-hand side face of the first engaging portion 46 are located between the right-hand side face of the first engaging portion 146 of the first hanging portion 138 of the auxiliary operating lever 132 and the left-hand side face of the second hanging portion 140, as shown in FIG. 3. Further, the loci of the upward movement of the right-hand side face of the upper end portion of the second operating lever 16 and the left-hand side face of the second engaging portion 48 are located between the right-hand side face of the second engaged portion 148 of the second hanging portion 140 of the auxiliary operating lever 132 and the left-hand side face of the stopper 154, as shown in FIG. 3. Therefore, when the fourth operating lever 20 is located in its second position, the first or second operating lever 14 or 16 can be moved upward from its first position against the urging force of the urging means 32.

When the first operating lever 14 is moved upward from its first position against the urging force of the urging means 32 to locate the first engaging portion 42 of the first operating lever 14 above the first engaged portion 146 of the first hanging portion 138 of the auxiliary operating lever 132, the first electric signal produced from the first signal generator SG1 causes the output shaft of the motor 104 to rotate in one direction at relatively high speed, thereby rotating the capstan 96 and the first gear 98 in the direction indicated by arrow A in FIG. 3 at relatively high speed. The position of the first operating lever 14 in this state is defined as its second position. When the first operating lever 14 is moved upward from its first position against the urging force of the urging means 32, the pinch roller is separated from the magnetic recording tape 188 in the tape cassette 8. Then, the tape 188 is released from the joint hold by the pinch roller and the capstan 96.

The relatively fast rotation of the first gear 98 in the direction indicated by arrow A is transmitted through the second gear 110 to the third gear 126. Then, the third gear 126 rotates in the direction indicated by arrow B in FIG. 3 at relatively high speed, so that the magnetic recording tape 188 in the tape cassette 8 is quickly fed from the second reel hub 186 to the first reel hub 184. Thus, a fast-forward mode is established in the tape recorder 6 which is provided with the signal detection operating lever device 4 according to this embodiment. This means that the first operating lever 14 serves as a fast-forward lever in the tape recorder 6.

While the magnetic recording tape 188 is quickly fed from the second reel hub 186 to the first reel hub 184 in the aforesaid manner, the magnetic head 42 functioning as the reproducing head is in contact with the tape 188, as shown in FIG. 3. It is therefore possible to set up playback mode in the state that the magnetic recording tape 188 travels at relatively high speed. If the upward pressing force on the first operating lever 14 is removed, then the first operating lever 14 is moved downward by the urging force of the urging means 32 to be located in its first position.

Figure 4:
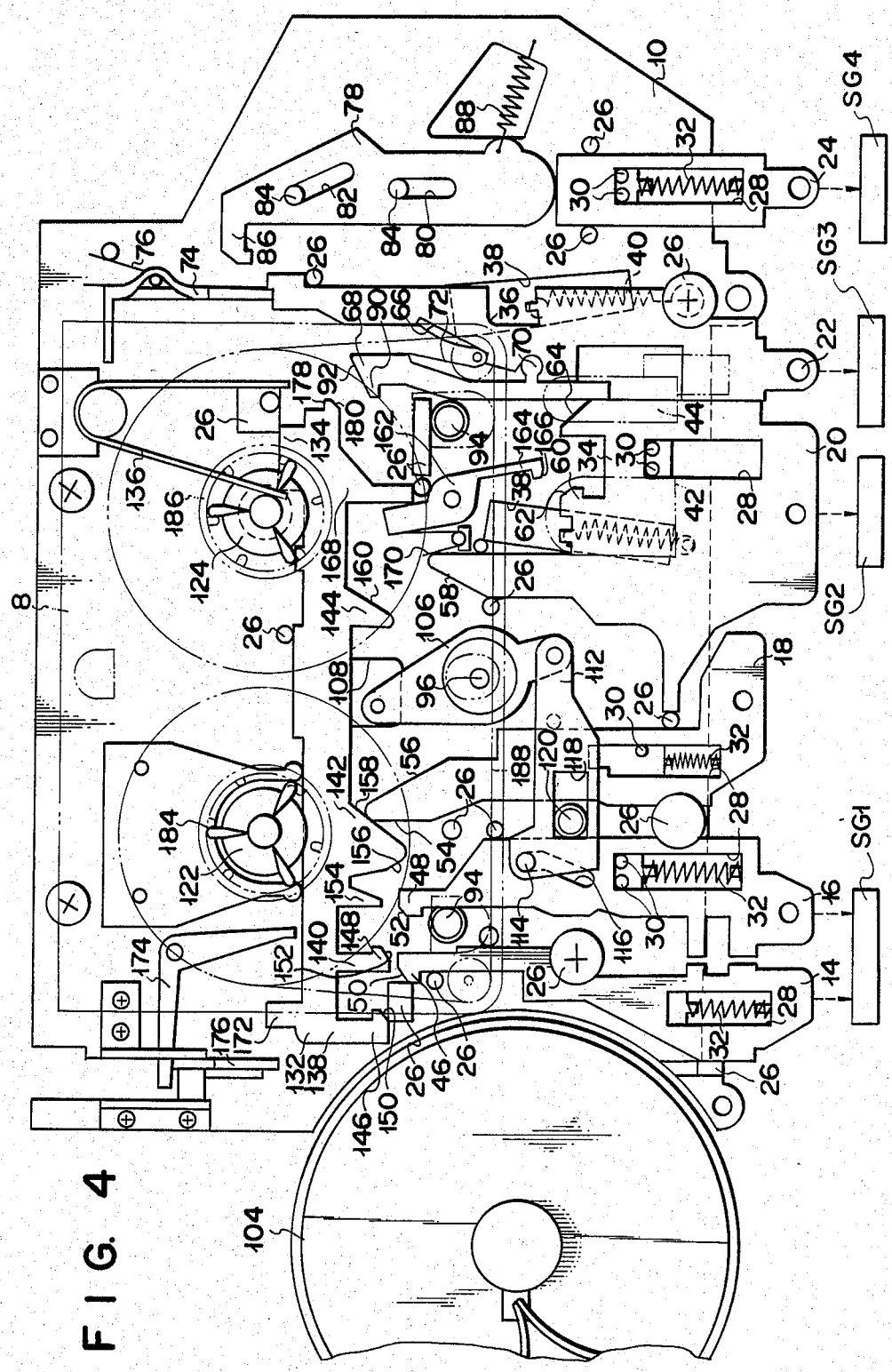
FIG. 4 is a plan view showing a state in which the pair of reel hubs of the tape cassette without accidental erasure preventive lugs are mounted on the pair of reel shafts of the tape recorder of FIG. 2, and in which a third operating lever to function as a stop lever is located in its second positon.

When the auxiliary operating lever 132 is in its second position, the other third auxiliary slant face 158 of the third hanging portion 142 vertically faces the one third slant face 54 of the third operating lever 18. Therefore, if the third operating lever 18 is moved upward from its first position against the urging force of the urging means 32, the one third slant face 54 of the third operating lever 18 comes into slide contact with the third auxiliary slant face 158 of the third hanging portion 142, thereby causing the auxiliary operating lever 132 to move from its second position to the left against the urging force of the urging means 136, as shown in FIG. 4. Then, the left-hand side face of the first hook member 168 of the auxiliary operating lever 132 abuts on the right-hand side face of the upper end portion of the second rotating lever 162, as shown in FIG. 4, to cause the second rotating lever 162 to rotate counterclockwise against the urging force of the urging means 167. Thereupon, the third operating lever 18 stops moving upwardly. The position of the third operating lever 18 in this state is defined as its second position. Also, the position of the auxiliary operating lever 132 in this state is defined as its third position.

When the second rotating lever 162 rotates counterclockwise, the fourth engaged projection 164 of the second rotating lever 162 is disengaged from the fourth engaging portion 60 of the fourth operating lever 20, as shown in FIG. 4. Then, the fourth operating lever 20 is moved downward by the urging force of the urging means 40 to be located in its first position.

When the fourth operating lever 20 is located in its first position, the second signal generator SG2 ceases to produce the second electric signal, thus stopping the rotation of the output shaft of the motor 104 and disabling the magnetic head 42, which is off the magnetic recording tape 188 in the tape cassette 8, as shown in FIG. 4, from functioning as the reproducing head. Thus, a stop mode is established in the tape recorder 6 which is provided with the signal detection operating lever device 4 according to this embodiment. This means that the third operating lever 18 serves as a stop lever in the tape recorder 6.

If the upward force having been so far applied to the third operating lever 18 against the urging force of the urging means 32 is removed, the third operating lever 18 is moved downward by the urging force of the urging means 32 to be located in its first position. As the third operating lever 18 moves from its second position to the first position, the auxiliary operating lever 132 is moved to the right by the urging force of the urging means 136 and is returned to its first position.

Figure 5:
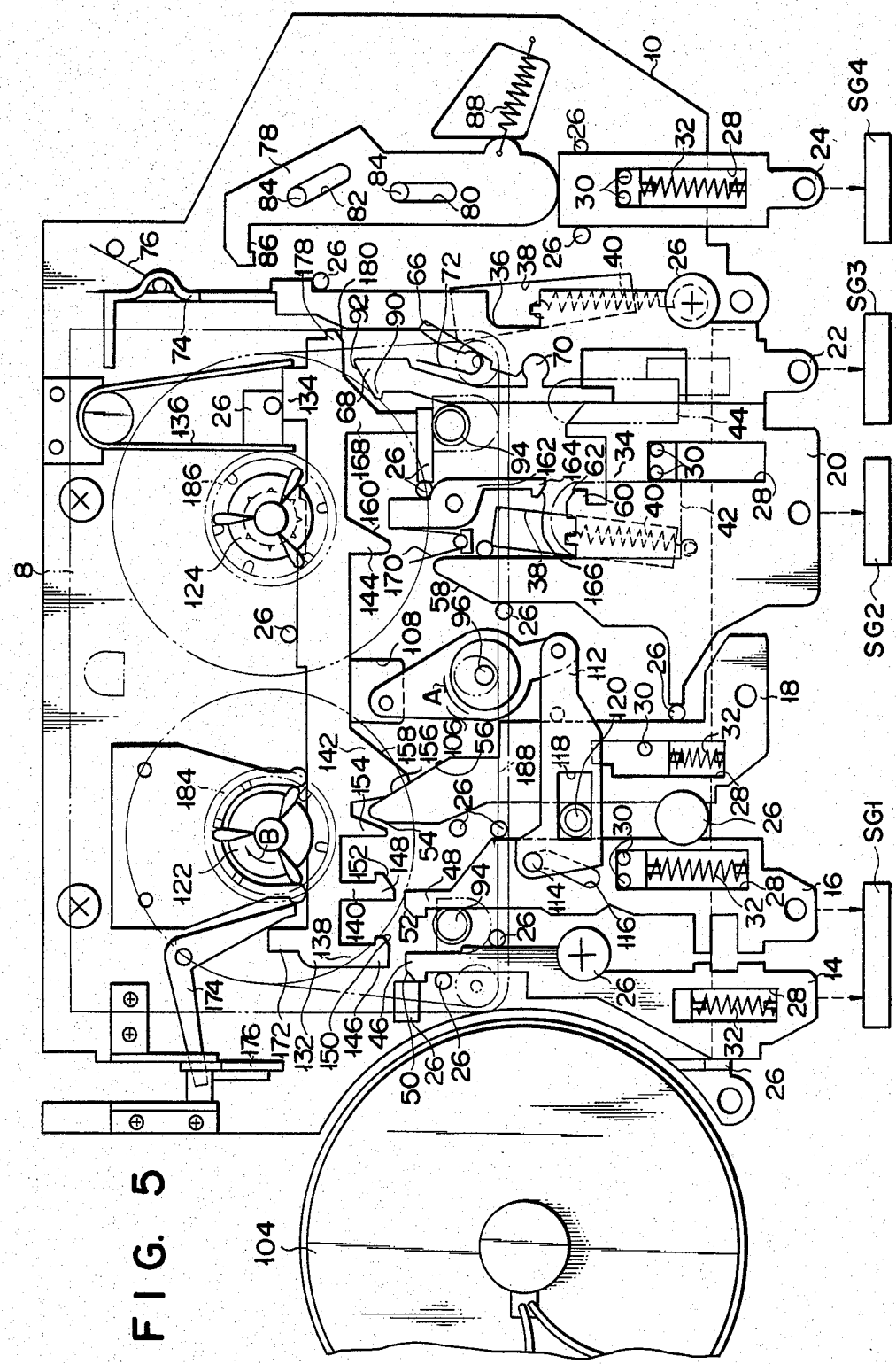
FIG. 5 is a plan view showing a state in which the pair of reel hubs of the tape cassette without accidental erasure preventive lugs are mounted on the pair of reel shafts of the tape recorder of FIG. 2, and in which the third operating lever is located in its second position to function as an ejecting lever.

If the third operating lever 18 is pushed up again when the auxiliary operating lever 132 is located in its first position, the other third slant face 56 of the third operating lever 18 comes into slide contact with the other third auxiliary slant face 156 of the third hanging portion 142 of the auxiliary operating lever 132, thereby causing the auxiliary operating lever 132 to move to the right from its first position against the urging force of the urging means 136, as shown in FIG. 5. Then, the second hook member 172 causes the third rotating lever 174 to rotate in the counterclockwise direction, and the third rotating lever 174 causes the ejecting lever 176 to rotate in the forward direction to cross the first base plate 10. The ejecting lever 176 causes a member (not shown) facing the bottom of the housing of the tape cassette 8 to move in the forward direction of FIG. 5, thereby moving the tape cassette 8 in the forward direction. Thus, the first and second reel hubs 184 and 186 of the tape cassette 8 are disengaged from the first and second reel shafts 122 and 124, respectively, of the tape recorder 6. That is to say, an ejecting mode is established in the tape recorder 6. This means that the third operating lever 18 further serves as an ejecting lever.

If the upward force on the third operating lever 18 is removed, the third operating lever 18 is moved downward by the urging force of the urging means 32 to be located in its first position. As the third operating lever 18 moves from its second position to the first, the auxiliary operating lever 132 is moved to the left by the urging force of the urging means 136, and is returned to its first position.

Assume that the first and second reel hubs 192 and 194 of the tape cassette 8 having accidental erasure preventive lugs are fitted on the first and second reel shafts 122 and 124, respectively. The capstan 96 is brought into contact with the rear surface of the magnetic recording tape 196 of the tape cassette 8 between the first and second reel hubs 192 and 194.

Figure 6:
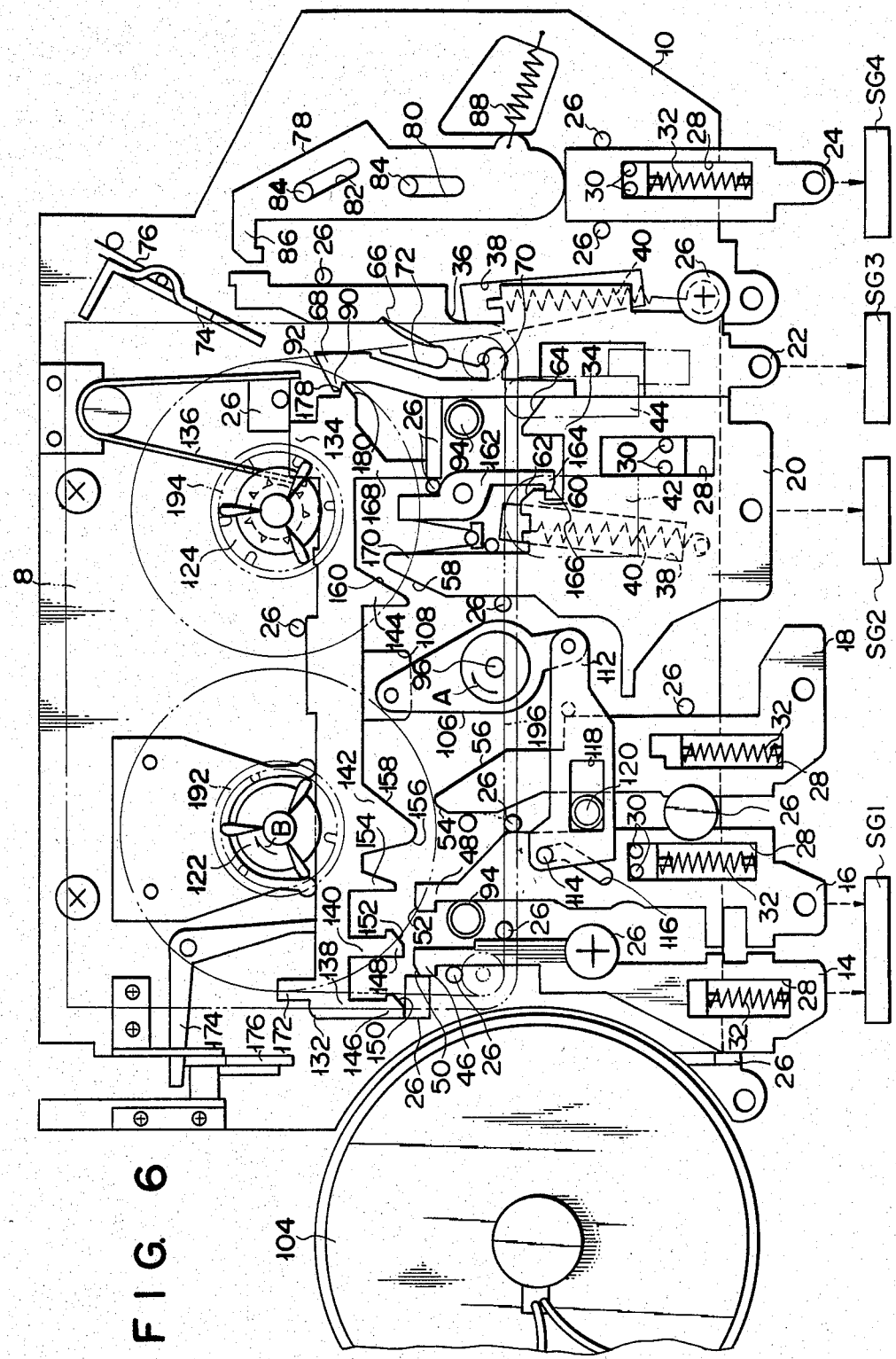
FIG. 6 is a plan view showing a state in which the pair of reel hubs of the tape cassette with accidental erasure preventive lugs are mounted on the pair of reel shafts of the tape recorder of FIG. 2, and in which the fourth operating lever to function as the playback lever and a fifth operating lever to function as a recording lever and constitute a second operating lever of the invention are located in their respective second positions.

The tape cassette 8 has accidental erasure preventive lugs. Therefore, the detector portion of the accidental erasure preventive lever 74 detects the accidental erasure preventive lugs. In other words, the detector portion is brought into contact with the accidental erasure preventive lugs. The accidental erasure preventive lever 74 is rotated from the first position in the clockwise direction against the urging force of the urging means 76. The lower end face of the accidental erasure preventive lever 74 is separated from the upper end face of the fifth operating lever 22 located in the first position, as shown in FIG. 6. Thus, the accidental erasure preventive lever 74 allows upward movement of the fifth operating lever 22 from the first position or downward movement from the first position thereof. At this time, the position of the accidental erasure preventive lever 74 is defined as its second position.

Suppose that the fourth operating lever 20 is located in its second position, as shown in FIG. 6. In this state, the fifth auxiliary slant face 180 of the auxiliary operating lever 132 in its second position vertically faces the fifth slant face 92 of the rocking lever 68, as shown in FIG. 3. Moreover, if the fifth operating lever 22 is pressed upward, it moves up from its first position against the urging force of the urging means 40. Since the left-hand side face of the rocking lever 68 of the upwardly moving fifth operating lever 22 is in slide contact with the right-hand side face of the support portion 34 of the fourth operating lever 20, the rocking lever 68 is kept from rocking around the projected portion 70, and the fifth slant face 92 is brought into slide contact with the fifth auxiliary slant face 180 of the auxiliary operating lever 132. Thereupon, the auxiliary operating lever 132 moves from its second position shown in FIG. 3 to the left against the urging force of the urging means 136. Before the auxiliary operating lever 132 is located in its third position shown in FIG. 4, the fifth engaged portion 178 of the auxiliary operating lever 132 and the fifth engaging portion 90 of the rocking lever 68 of the fifth operating lever 22 engage each other. Then, the fifth operating lever 22 stops its upward movement. The position of the fifth operating lever 22 in this state is defined as its second position. Further, the position of the auxiliary operating lever 132 in this state is defined as its fourth position.

When the fifth operating lever 22 is located in its second position, the erasing head 44 comes into contact with the surface of the magnetic recording tape 188, as shown in FIG. 6.

At that time, the third signal generator SG3 causes the magnetic head 42 to function as the recording head. In this state, therefore, information collected by means of a microphone (not shown) attached to the tape recorder 6 is recorded on the magnetic recording tape 188 by the magnetic head 42 as the tape 188 runs from the second reel hub 186 to the first reel hub 184 at the fixed speed. Thus, a recording mode is established in the tape recorder 6 which is provided with the signal detection operating lever device 4 according to this embodiment. This means that the fifth operating lever 22 serves as a recording lever in the tape recorder 6.

When the auxiliary operating lever 132 is in its fourth position, the upper end face of the first operating lever 14 vertically faces the lower end face of the second hanging portion 140 of the auxiliary operating lever 132, as shown in FIG. 6. At the same time, the upper end face of the second operating lever 16 vertically faces the lower end face of the stopper 154 of the auxiliary operating lever 132, as shown in FIG. 6. Accordingly, if the first or second operating lever 14 or 16 is pressed upward when the tape recorder 6 is in the recording mode, then the upper end face of the first or second operating lever 14 or 16 will abut on the lower end face of the second hanging portion 140 or the stopper 154 of the auxiliary operating lever 132. It is therefore impossible to locate the first or second operating lever 14 or 16 in its second position. Thus, the fast-forward or fast rewinding mode cannot be established while the tape recorder 6 is in the recording mode.

The fourth and fifth operating levers 20 and 22 in their respective second positions are returned to their respective first positions by the urging forces of the urging means 40, respectively, by locating the third operating lever 18 to its second position to bring the auxiliary operating lever 132 to its third position, thereby disengaging the fourth engaged projection 164 of the second rotating lever 162 and the fifth engaged portion 178 of the auxiliary operating lever 132 from the fourth engaging portion 60 of the fourth operating lever 20 and the fifth engaging portion 90 of the rocking lever 68 of the fifth operating lever 22, respectively.

Figure 7:
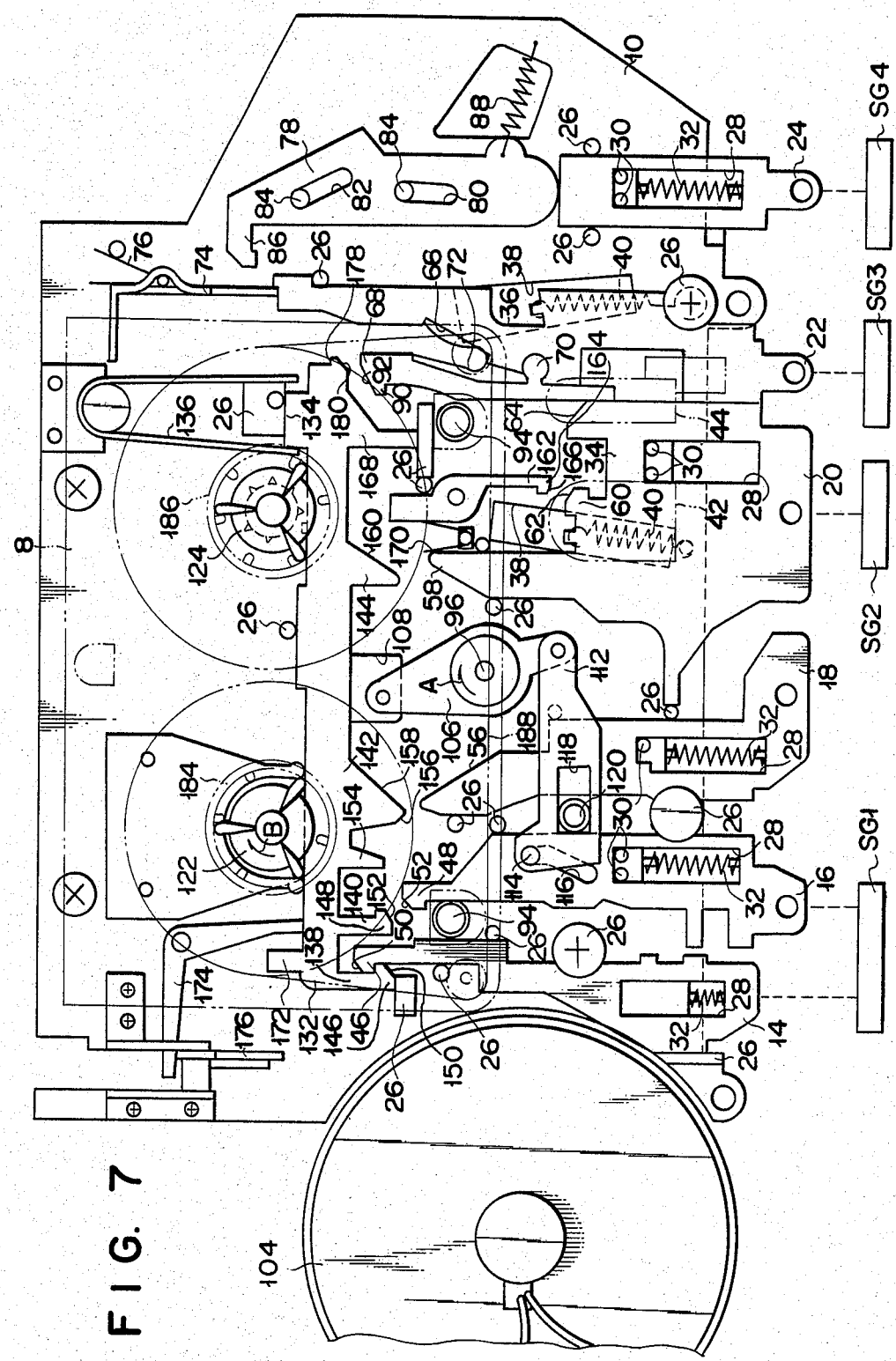
FIG. 7 is a plan view showing a state in which the pair of reel hubs of the tape cassette without accidental erasure preventive lugs are mounted on the pair of reel shafts of the tape recorder of FIG. 2, and in which a first operating lever to function as a fast-forward lever and to set up a fast-forward mode which is one of the magnetic recording tape transport mode is located in its second position.

If the first operating lever 14 is pressed upward against the urging force of the urging means 32 when the first to sixth operating levers 14, 16, 18, 20, 22 and 24 are in their respective first positions, as shown in FIG. 2, then the first slant face 50 of the first operating lever 14 comes into slide contact with the first auxiliary slant face 150 of the first hanging portion 138 of the auxiliary operating lever 132 to cause the auxiliary operating lever 132 to move from its first position to the left against the urging force of the urging means 136. Before the auxiliary operating lever 132 reaches its third position, the first engaging portion 46 of the first operating lever 14 engages the first engaged portion 146 of the first hanging portion 138 of the auxiliary operating lever 132, as shown in FIG. 7. Thereupon, the first operating lever 14 stops its upward movement. The position of the first operating lever 14 in this state corresponds to its first position. Thus, the fast-forward mode is established in the tape recorder 6. The position of the auxiliary operating lever 132 is defined as its fifth position. The second auxiliary slant face 152 of the auxiliary operating lever 132 in the fifth position vertically faces the second slant face 52 of the second operating lever 16.

Figure 8:
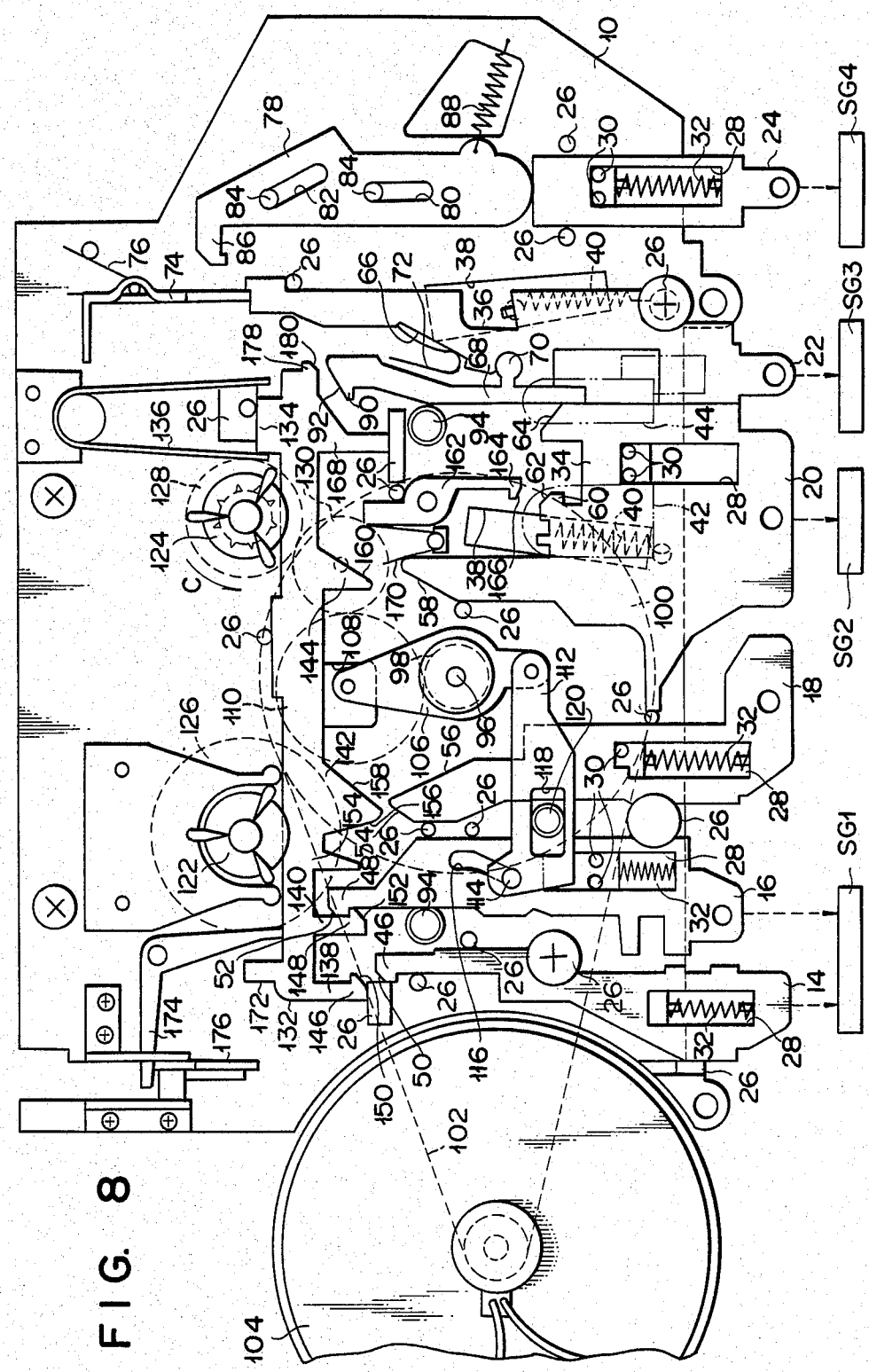
FIG. 8 is a plan view showing a state in which a second operating lever to function as a fast rewinding lever of the tape recorder of FIG. 2 is located in its second position.

If the second operating lever 16 is pressed upward against the urging force of the urging means 32 when the first operating lever 14 is in its second position, the second slant face 52 of the second operating lever 16 comes into slide contact with the second auxiliary slant face 152 of the second hanging portion 140 of the auxiliary operating lever 132 in its fifth position, thus causing the auxiliary operating lever 132 to move from its fifth position to the left against the urging force of the urging means 136. When the left-hand side face of the second engaging portion 48 of the second operating lever 16 comes into contact with the right-hand side face of the second engaged portion 148 of the second hanging portion 140 of the auxiliary operating lever 132, the first engaging portion 46 of the first operating lever 14 is disengaged from the first engaged portion 146 of the first hanging portion 138 of the auxiliary operating lever 132, and the first operating lever 14 is returned to its first position by the urging force of the urging means 32. Thereafter, if the second operating lever 16 is further moved upward, the second engaging portion 48 of the second operating lever 16 engages the second engaged portion 148 of the second hanging portion 140 of the auxiliary operating lever 132, as shown in FIG. 8. Thereupon, the second operating lever 16 stops its upward movement. The position of the second operating lever 16 in this state is defined as its second position. The position of the auxiliary operating lever 132 in this state corresponds to its fifth position. The first auxiliary slant face 150 of the first hanging portion 138 of the auxiliary operating lever 132 in the fifth position vertically faces the first slant face 50 of the first operating lever 14 in its first position.

As the second operating lever 16 moves from its first position to the second, the coupling member 112, which has its guide pin 114 guided by the guide hole 116 of the second operating lever 16, moves from the position shown in FIG. 2 to the left. As the coupling member 112 moves to the left, the first rotating lever 106 rotates clockwise from its first position shown in FIG. 2. Thus rotated, the first rotating lever 106 keeps the second gear 110 apart from the third gear 126 of the first reel shaft 122. When the coupling member 112 stops its leftward movement, that is, when the second operating lever 16 is located in its second position, the second gear 110 of the first rotating lever 106 comes to be in mesh with the fifth gear 130, as shown in FIG. 8. The position of the first rotating lever 106 in this state is defined as its second position.

When the second operating lever 16 is located in its second position, the first signal generator SG1 generates the first electric signal and the output shaft of the motor 104 rotates in one direction at relatively high speed, causing the capstan 96 and the first gear 98 to rotate in the direction indicated by arrow A in FIG. 3 at relatively high speed. When the second operating lever 16 is moved upward from its first position against the urging force of the urging means 32, the pinch roller is removed from the magnetic recording tape 188 in the tape cassette 8. Thus, the tape 188 is released from the joint hold by the pinch roller and the capstan 96. In FIG. 8, the magnetic recording tape 188 of the tape cassette 8 and the second base plate 12 are omitted so as to understand the movement of the first to fifth gears 98, 110, 126, 128 and 130 more easily. The accidental erasure preventive lugs of the tape cassette are removed. The relatively fast rotation of the first gear 98 in the direction indicated by arrow A is transmitted through the second gear 110 to the fifth gear 130. Then, the fourth gear 128 rotates in the direction indicated by arrow C in FIG. 8 at relatively high speed, so that the magnetic recording tape 188 in the tape cassette 8 is quickly rewound from the first reel hub 184 fitted on the first reel shaft 122 to the second reel hub 186 fitted on the second reel shaft 124. Thus, a fast rewinding mode is established in the tape recorder 6 which is provided with the signal detection operating lever device 4 according to this invention. This means that the second operating lever 16 serves as a fast rewinding lever in the tape recorder 6.

If the auxiliary operating lever 132 is shifted from its fifth position shown in FIG. 8 to its third position by locating the third operating lever 18 in its second position, the second engaging portion 48 of the second operating lever 16 is disengaged from the second engaged portion 148 of the second hanging portion 140 of the auxiliary operating lever 132, and the second operating lever 16 is returned to its first position by the urging force of the urging means 32. Thereupon, the coupling member 112, having its guide pin 114 guided by the guide hole 116 of the second operating lever 16, moves to the right to locate the first rotating lever 106 in its first position, as shown in FIG. 2.

If the first to fifth operating levers 14, 16, 18, 20 and 22 are respectively located in their first positions, as shown in FIG. 2 and if the sixth operating lever 24 is moved upward, the sixth operating lever 24 is moved upward against the urging force of the urging means 32. At this time, the flat drive member 78 is also moved upward against the urging force of the urging means 88. The flat drive member 78 is oriented to the left by the first and second guide holes 80 and 82.

Figure 9:
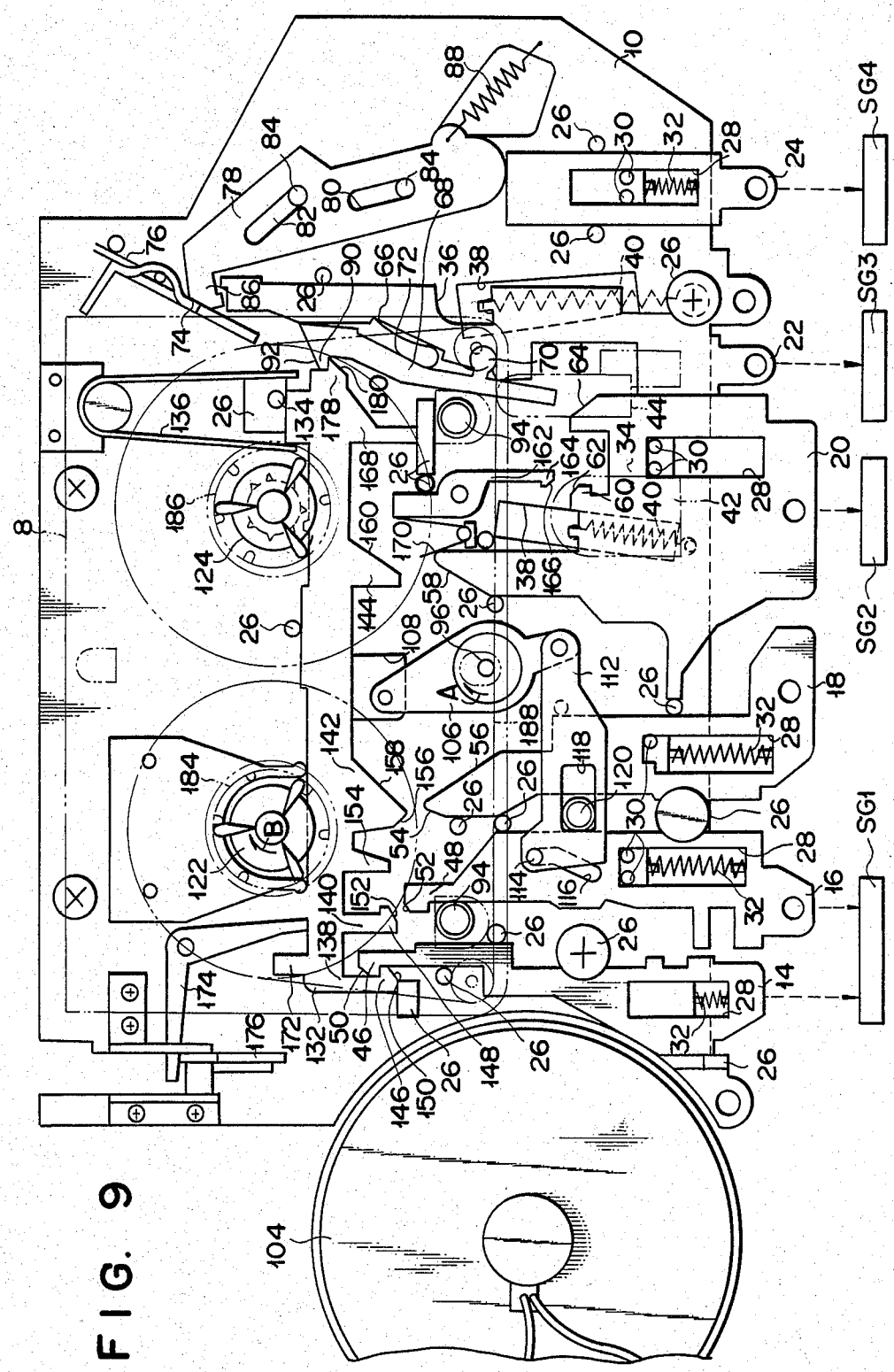
FIG. 9 is a plan view showing the state in which a pair of reel hubs of the tape cassette without accidental erasure preventive lugs are fitted with a pair of reel shafts of the tape recorder shown in FIG. 2, wherein the accidental erasure preventive lever is located at its second position by disposing the sixth operating lever constituting a third operating lever as defined in the claims at its second position, and a first operating lever which corresponds to a first operating lever as defined in the claims and which functions as a fast-forward lever and a fourth control lever which corresponds to a second lever as defined in the claims and which functions as a recording lever are located in their respective second positions.

The abutment member 86 of the flat drive member 78 which is oriented to the left abuts against the lower end of the accidental erasure preventive lever 74 if accidental erasure preventive lugs of the tape cassette 8 are cut off. Thus, the abutment member 86 causes the accidental erasure preventive lever 74 to be located in the second position thereof, as shown in FIG. 9. Therefore, the upward movement of the sixth operating lever 24 from the first position thereof is completed.

At this time, the position of the sixth operating lever 24 is defined as a second position thereof.

After the sixth operating lever 24 is located in the second position, the fifth operating lever 22 is moved upward against the urging force of the urging means 40. The rocking lever 68 brings the fifth slant face 92 in slidable contact with the fifth auxiliary slant face 180. Simultaneously, the lower end of the left side surface of the rocking lever 68 is slid along the slant face 64 of the support portion 34. At this time, the rocking lever 68 is rotated round the projected portion 70 in the clockwise direction against the urging force of the urging means 72. That is, the rocking lever 68 is pivoted clockwise about the projected portion 70, that is, from the second to first positions of the auxiliary operating lever 132. Before the slidable contact between the fifth slant face 92 of the rocking lever 68 and the fifth auxiliary slant face 180 of the auxiliary operating lever 132 is completed, the upper end of the right-hand side face of the rocking lever 68 comes in contact with the left-hand side face of the fifth operating lever 22. Therefore, the rocking lever 68 stops rotating. At this time, the position of the rocking lever 68 is the second position thereof.

The rocking lever 68 is then moved upward by the fifth operating lever 22 and the fifth slant face 92 slidably contacts with the fifth auxiliary slant face 180. Therefore, the auxiliary operating lever 132 is moved from the first position to the left against the urging force of the urging means 136.

When the fifth engaging portion 90 is engaged with the fifth engaged portion 74, as shown in FIG. 9, upward movement of the fifth operating lever 22 is completed. At this time, the position of the fifth operating lever 22 is the second position thereof. The position of the auxiliary operating lever 132 is the fifth position thereof. Therefore, the erase head 44 is in contact with the surface of the magnetic recording tape 188 of the tape cassette 8.

The projection extending upward from the upper end surface of the fifth operating lever 22 which is located in the second position thereof comes to be engaged with the projection extending downward from the lower end face of the abutment member 86 of the flat drive member 78, as shown in FIG. 9. Therefore, after the fifth operating lever 22 is brought into the second position as shown in FIG. 9, the flat drive member 78 is kept at the second position as shown in FIG. 9, even if the urging force acting upward on the sixth operating lever 24 is removed.

When the flat drive member 78 is located in the second position thereof, a fourth signal generator SG4 (not shown) generates a fourth electrical signal so that the erase head 44 functions as the signal detection head.

As shown in FIG. 9, assume that the first operating lever 14 is kept in the second position thereof. Immediately before the first operating lever 14 is located in the second position thereof, the auxiliary operating lever 132 is slightly moved to the left from the fifth position against the urging force of the urging means 136 due to slidable contact between the first slant face 50 and the first auxiliary slant face 150. However, at the same time, the rocking lever 68 pivots about the projected portion 70 in the clockwise direction by the urging force of the urging means 72 to follow the rotation of the auxiliary operating lever 132. Therefore, when the first operating lever 14 is located in the second position thereof, the fifth engaging portion 90 of the rocking lever 68 is kept engaged with the fifth engaged portion 178 of the auxiliary operating lever 132, as shown in FIG. 9.

The erase head 44 which is functioning as the signal detection head detects a CUE signal which has already recorded on the magnetic recording tape 188 traveling at a relatively high speed from the second reel hub 186 to the first reel hub 184.

The first operating lever 14 located in the second position can be returned to the first position by moving the third operating lever 18 to the second position, and the auxiliary operating lever 132 to the third position. The fifth engaged portion 178 located in the third position of the auxiliary operating lever 132 is located to the left of the fifth engaging portion 90 of the rocking lever 68, as shown in FIG. 3. Therefore, the fifth engaged portion 178 is disengaged from the fifth engaging portion 90. The fifth operating lever 22 returns to the first position by the urging force of the urging means 40. When the fifth operating lever 22 is located in the first position, the projection formed on the upper end surface of the fifth operating lever 22 is disengaged from the projection formed on the lower end surface of the abutment member 86 of the flat drive member 78. The flat drive member 78 returns to the first position by the urging force of the urging means 88, as shown in FIG. 2. If the tape cassette 8 without accidental erasure preventive lugs is mounted in the tape recorder 6, the accidental erasure preventive lever 74 returns to the first position by the urging force of the urging means 76, as shown in FIG. 2.

In this embodiment, the third and fourth signal generators SG3 and SG4 constitute a magnetic head function selecting means.

Although an illustrative embodiment of this invention has been described in detail herein, it is to be understood that the invention is not limited to such embodiment, and that various changes and modifications may be effected therein by one skilled in the art without departing from the scope or spirit of the invention.

What we claim is:

1. A signal detection operating lever device for a magnetic recording tape reproducing apparatus which uses a tape cassette and which sets a magnetic recording tape transport mode comprising:
   a first base plate;
   a second base plate parallel to said first base plate with a distance therebetween;
   a first operating lever disposed between said first and second base plates to be movable along the first and second base plates between a first position and a second position to determine a magnetic recording tape transport mode in the magnetic recording tape reproducing apparatus;
   a second operating lever having a magnetic head and disposed between said first and second base plates to move said magnetic head along said first and second base plates between a first position in which said magnetic head is separated from the magnetic recording tape of the tape cassette and a second position in which said magnetic head comes in contact with the magnetic recording tape;

an accidental erasure preventive lever disposed at least at one of said first and second base plates to be movable between a first position in which said second operating lever is prohibited to move from the first position to the second position thereof, and a second position in which said second operating lever is allowed to move from the first position to the second position thereof;

a third operating lever disposed between said first and second base plates to be movable between a first position which allows movement of said accidental erasure preventive lever between the first and second positions thereof along said first and second base plates, and a second position in which said accidental erasure preventing lever is kept at the second position thereof; and magnetic head function selecting means connected to said second and third operating levers for allowing said magnetic head to function as an erase head upon movement of said second operating lever to the second position thereof and for allowing said magnetic head to function as a signal detecting head upon movement of said third operating lever to the second position thereof.

2. The signal detection operating lever device of claim 1, wherein said magnetic recording tape transport mode is set in response to an electrical signal generated from a signal generating means.

3. The signal detection operating lever device of claim 2, wherein, when said first operating lever is disposed at said first position, said signal generating means stops generating said electrical signal; and wherein when said first operating lever is disposed at said second position, said signal generating means generates said electrical signal.

* * * * *